Dec. 23, 1969  E. A. POWERS  3,485,373
MEANS FOR POWER SIPHONING OF LIQUID FROM ONE
TANK TO ANOTHER, ESPECIALLY FOR AQUARIUMS
Filed Dec. 21, 1966  2 Sheets-Sheet 1
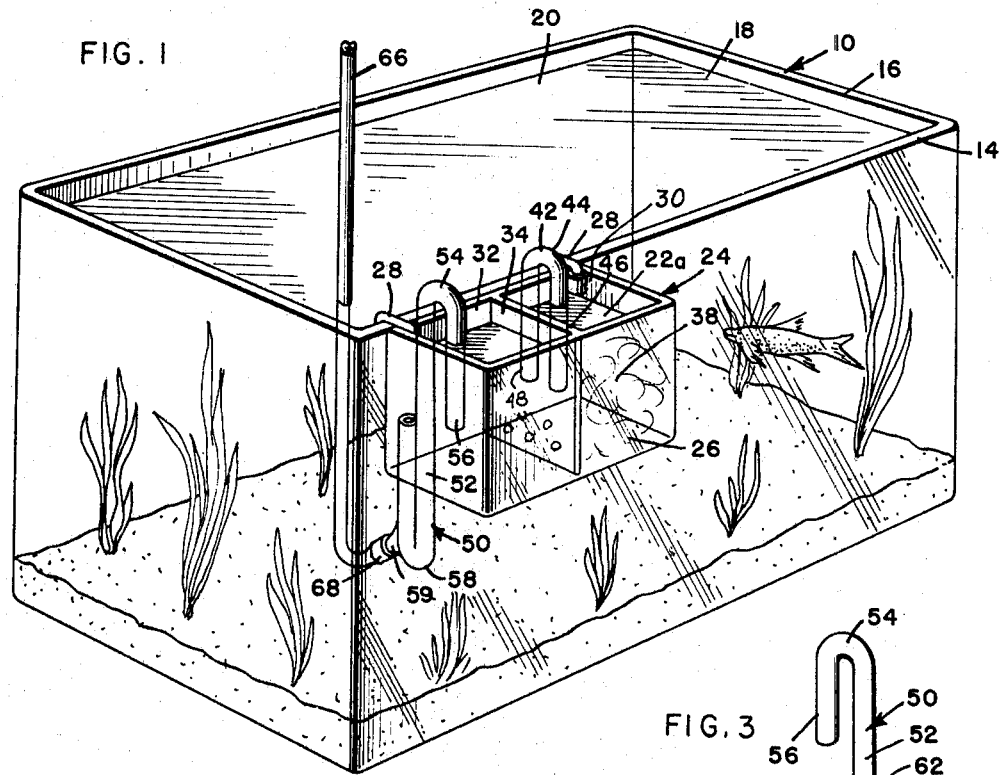
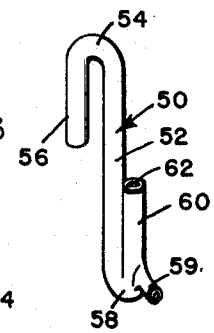
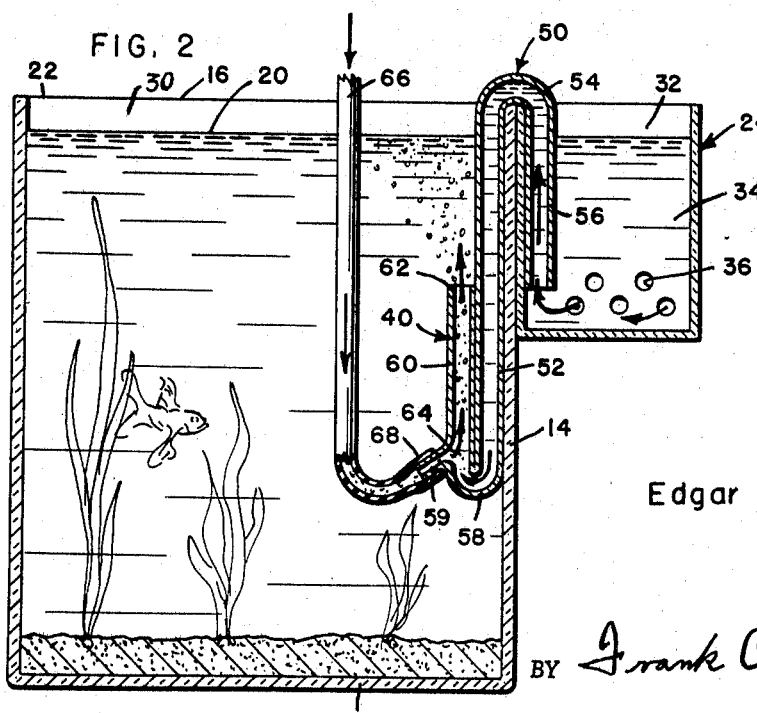
Edgar A. Powers
INVENTOR
BY Frank C. Maley
AGENT

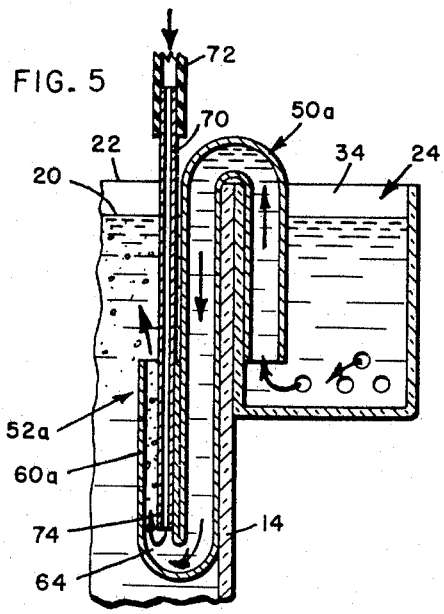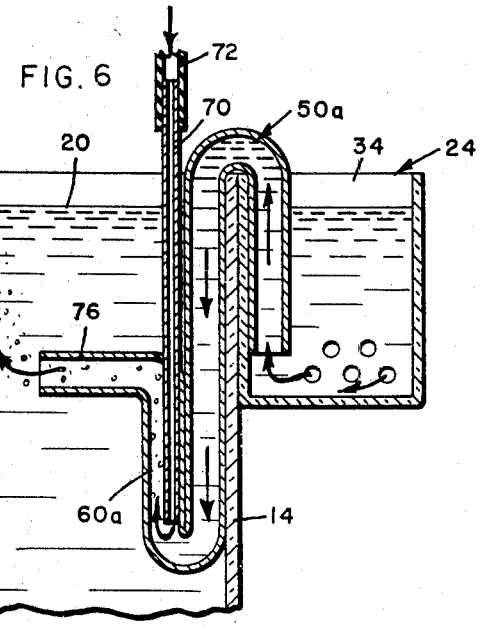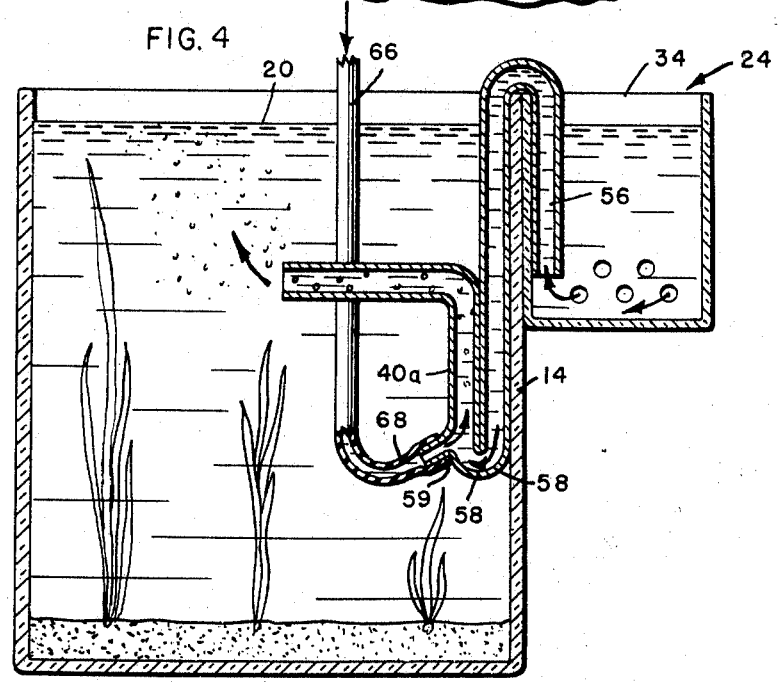

United States Patent Office 3,485,373
Patented Dec. 23, 1969

3,485,373
MEANS FOR POWER SIPHONING OF LIQUID FROM ONE TANK TO ANOTHER, ESPECIALLY FOR AQUARIUMS
Edgar A. Powers, 104 Church St.,
Lake Ronkonkoma, N.Y. 11779
Filed Dec. 21, 1966, Ser. No. 603,554
Int. Cl. B01d 35/00
U.S. Cl. 210—169      6 Claims

ABSTRACT OF THE DISCLOSURE

A natural siphoning arrangement coupled structurally and functionally with a power siphon arrangement for moving a body of water from one tank into and from an adjoining tank, particularly for use in association with water for filtering aquariums.

---

An important object of the present invention is to provide a means whereby power siphon action accomplishes the transferring of a liquid from a tank, such as an aquarium tank, to and from an outside tank, such as a filter tank for an aquarium.

In the case of aquariums, it is oftentimes necessary to elevate water from a lower to higher position, that is, to force the water over the aquarium walls and stimulate a flow through a filtering means. Such means conventionally includes a prime mover operated pump or a high type compressor.

Certain factors must be considered in connection with such movement of liquids from one container or tank, such as the filtering movement of water from an aquarium tank to and from an adjoining filter tank. It is well known that, except for the expense involved, prime mover actuated pumps, whether piston or centrifugal, afford a positive powered means for the transfer of the water. However, the cost of such motor driven pumps is very high and, therefore, it is a matter of economic discouragement for the economy minded public to purchase and utilize such filtering means. A method of filterization movement of the liquid from an aquarium tank, which is by far less expensive than the pump type arrangement, is the use of compressed air as a means of moving the liquid, so that the compressed air serves as a source of motivation for the transfer of the liquid from the aquarium tank to the filtering means. Air compressors are found less expensive than electric motors or the like prime movers which are needed for operation of the water motivating pumps.

But, high powered compressors, which must themselves initiate, carry on and continue the movement of the water are also very expensive to purchase and maintain.

Therefore, an important object of the present invention is to provide a means whereby a siphonic action is prearranged and is continued by a weaker compressor which continues the circulation task after the basic labor has been eliminated. In other words, a weaker compressor may not possess the power capacity to power the liquid over a wall but, if the liquid is already in a moving state, such weaker compressor, if employed correctly, in accordance with the present invention, would have the capability of continuing the flow or motivation of the liquid.

Most means of water or liquid air compressor type motivation means, as shown in the prior art (represented by the patents to Murphy, No. 3,149,608; Pettas, No. 2,674,-574; and Feldman, No. 2,491,853) involves rather basic and expensive methods for the conveyance of fluid through tubes with the assistance or aid of air pressure.

The most basic means of motivation may be discerned in practically all of the prior art. This method is of the type that an open tube is submerged in water and has an opening in its lower submerged end portion for the introduction of compressed air. Solely under the force of compressed air injected into the lower submerged end portion, the water is motivated so as to move within the tube and discharge over the upper end of the tube within the body of water with air bubbles. As long as this unit is submerged below the surface of the water, it remains relatively effective.

In a further method, it is attempted to continue this motivation above the surface level of the tank. When this is endeavored, complications are encountered. Such complications, principally one, necessitate the forcing of the water through the tube above the water level line, which sometimes requires the utilization and incorporation of an expensive, high power pump means actuated by a motor, irrespective of the type thereof, for if the same length of tube extends above the water level line, the speed and amount of water conveyed must diminish, depending upon the altitude endeavored, the interior diameter of the tube and the amount of air pressure.

In all the known devices, there is a motivation of water, which either occurs below the surface level of the aquarium tank or above the surface level thereof. The latter form of motivation would be most difficult because of the fact that there is a gravitational factor that has to be borne in mind.

An important object of the present invention is to overcome the gravitational pull which exists above the water level line in tubing extending and communicating between an aquarium tank and a filtering tank with an ability to provide what may be termed a siphon action in reverse. In other words, water is conveyed from a lower level tank to a higher level tank under a unique power siphon action, which can be defined as a device wherein one side is a natural siphon and the other side is a motivational means.

A further important object of the present invention is to so orientate the compressed air with respect to a tubing so that it accomplishes an effective, economic and simple means and method whereby, in its structural association with tubing communicating between an aquarium tank and a filter means, associated with the aquarium tank, a very definite, positive and continuous conveyance of the water and clearance thereof is realized in an extremely simple, effective and economical manner.

A still further important object of the present invention is to provide a novel and extremely inexpensive and effective means for the motivation of liquid in a connecting tubing between an aquarium tank tnd an adjoining filtering tank under a power siphon action, as distinguished from a powered suction or vacuum action.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a view in perspective of an aquarium tank and filter tank arrangement, the two tanks being interconnected by a novel siphon means with the water being moved from the aquarium tank into and from the filter tank arrangement in accordance with the novel power siphon method of the present invention;

FIGURE 2 is a vertical cross-sectional view of the tanks, showing the power siphoning tubing partly in vertical section;

FIGURE 3 is a view in perspective of the interconnecting power siphon tubing, per se, adapted to be operatively disposed between the aquarium tank and the filtering tank;

FIGURES 4 through 6 are fragmentary and detailed vertical cross-sectional views, similar to FIGURE 2, showing different tubing arrangements and means for introducing the compressed air into the power siphon tubing arrangements so as to realize the novel power siphon action and method of the present invention.

Referring now more particularly to the accompanying drawings, and initially to FIGURES 1–3, the aquarium tank 10, which is shown as rectangular and as being composed of a bottom wall 12 with integrally associated, transparent opposing side walls 14 and opposing end walls 16, is adapted to contain a body of water 18, having a surface level 20 below the open top 22 of the tank. The particular shape, configuration or material of the tank is immaterial from the standpoint of the present invention and the tank is shown in its particular structural size, arrangement and formation, merely for exemplary purposes.

A filtering means 24 is operatively associated with the tank and, for the sake of simplicity of explanation of the present invention, the filtering means 24 is shown as comprising a two compartment tank 26 suspended by hook means 28 freely positioned over the upper edge of one of the side walls of the tank 10 so that the two compartment tank 26 is suspended from the outside of the aquarium tank 10. The tank 26 comprises a first chamber or compartment 30 and an adjoining second chamber or compartment 32, the chambers or compartments being definitely separated by a solid vertical partition wall 34, which is provided, adjacent its lower end, with transverse apertures 36 for the flow of water from the compartment 30 into the compartment 32. The apertures allow passage of the water from the compartment 30 to the compartment 32, with the compartment 30 being provided with any usual filtration means 38, which may be spun glass, charcoal or any of the like filtration means which is well known in the art.

The present invention relates to a novel siphon means 40, which is provided for effecting a continuous action of the water 20 so as to move the water, under a low compressed air source, in a power siphon action for the movement of the water 20 into and from the filtering means 24 whereby the water 20 is constantly being circulated into and from the filtering means 24 to the tank 10 so that the water 20 is kept constantly clean and free from any impurities.

The siphon means 40 comprises, in the related environment, a simple U-shaped siphon tube or tubing 42, which has its web portion 44 hanging on the upper edge of the side wall that supports the filtering means 24, so that its opposing open-ended leg portions 46 and 48 are freely disposed, respectively, within the compartment 30 and the interior of the aquarium tank 10.

As aforestated by way of example, the filtering means 24 is supported on the outside of the rim of the aquarium side wall and the water level within the filtering chamber 30 is made equal to the water level 20 of the water in the aquarium tank. Therefore, a general siphoning action is established between the aquarium tank and the chamber 30 by virtue of the simple U-shaped siphon tube 42, which is devoid of air and filled with liquid so as to connect the body of water 20 in the aquarium and the body of water 22a in the compartment 30. It can be understood that the level of the bodies of water 20 and 22a are equal and that the siphon tube 42 is devoid of air and filled with water so that a simple siphoning action is placed in potentiality.

The power siphon means 40 most importantly in the disclosed form includes a tube or tubing 50, which is shown more particularly in FIGURES 2 and 3. The tube 50 comprises an elongated main hollow portion 52, which is straight and which has a hollow upper arcuate or curved end portion 54 that terminates in an integral downwardly extending end portion 56, the latter having an open end and being adapated to be disposed within the chamber 32, as shown in FIGURES 1 and 2.

The main body portion 52 of the tubing 50 also includes a U-shaped lower end portion 58, which has an upstanding end portion 60 that terminates in an open end 62. The curved or arcuate portion 54 is adapted to be simply hooked over the upper end of the side wall of the aquarium tank with the depending end portion 56 immersed within the water in the chamber or compartment 32, as shown in FIGURE 2, and with the main straight body portion 52 lying alongside the interior of the side wall 14 and being perpendicularly disposed. The adjoining vertical lower leg portion 60 is disposed alongside the main portion 52 with its open discharging end 62 lying below the water surface level 20, as shown in FIGURE 2.

An integral laterally and downwardly extending nipple portion 59 is provided and is disposed adjacent the lower U-shaped lower end portion 58 of the tubing so that it is in immediate and direct communication with the lower open end 64 of the vertically orientated discharging end portion 60. A flexible tubing 66, which serves as a carrier for compressed air, has an end portion 68, which is sleeved onto the nipple 59 so that the compressed air (which comes from a weak source of compressed air—not shown) from the flexible tubing 66, as indicated by the arrows, in FIGURE 2, is directed immediately into the lower end portion 64 of the end portion 60 of the tubing 50. Bearing in mind that the power siphon tube 50 is devoid of air and filled with water and that the level of the water in the filtering chamber 32 is made equal to the water level 20 of the aquarium tank, it can be understood that a general siphoning is established between the compartment 32 and the aquarium tank 10. When the power siphon is put into effect by passing compressed air through the flexible tubing 66 and into the nipple 59 and directly and immediately into the lower open end 64 of the leg portion 60 of the tube 50, water is siphoned out of the compartment 32 to the interior of the aquarium 10. The water in the aquarium rises to a higher level and the elevated water in the aquarium tank then flows through the naturally functioning siphon tube 42 into the filter compartment 30. This action makes the water level in the compartment 30 of a higher altitude than the water level in the compartment 32 and the water flows through the filtering material or substance 38 to the bottom of the compartment 30 and then through the apertures or openings 36, which connect the compartment 30 with the compartment 32. This filtered water then passes upwardly through the leg portion 56 and the filtered water then repeats the cycle by passing again through the power siphon action under the compressed air introduced by the tubing 66.

It can thus be realized that two siphonic conditions prevail and if the siphonic condition is prearranged, it permits a weaker compressor to possess the ability to continue the job after the basic labor has been eliminated. In other words, a weak compressor may not have the capacity to power liquid over a wall but if the liquid was already over the wall it would have the ability to continue its motivation. With the primed power siphon, the liquid has already climbed the aquarium wall before the compressor is turned on and all the compressor (not shown but of conventional construction) has to do is to motivate the liquid through the tubing. It is important to note that the power siphon comprises the solid tube of liquid connecting two individual bodies of water before the compressor is put into operation and that the motivation of water by the rise of air bubbles reduces the initial workload of conveying liquid over walls, enabling weaker compressors to have the ability to accomplish work designed for pumps or stronger compressors. The compressor is not required to elevate the water or liquid but merely to motivate it, which is an extremely important factor.

Thus, the power siphon arrangement, which consists of the tubings or tubes 42 and 50 whereby the adjoining compartments 30 and 32 of the filtering means or chamber are interconnected and related with the interior of the aquarium tank 10 for the passage of water from the aquarium tank 10 through the filtering means and the return of the filtered water to the aquarium tank, is in essence a power conveyance of liquid from one tank to another, under air pressure, with a speeding of the flow of the water or liquid under a weaker air pressure.

Consequently, the workload in conveying liquids over high altitudes is reduced and the speed of the flow of water over elevated obstructions is enhanced with the powering of liquid from lower to higher levels being realized so that there is generated a circulation of aquarium water by discharging pure water into the aquarium tank after withdrawing, under a siphon action, water from the aquarium tank, whereby there will be a constant stirring and turbulent action of the water in the aquarium tank.

In FIGURE 5, the tubing 50a is shown, which is similar in construction and function to the tubing 50 but the manner or means of introducing the motivation or powering air pressure is slightly different. In this respect, the power tubing 52a is identical in construction and configuration to the tubing 50 except that the nipple 59 is not employed or provided and, instead, the compressed air is introduced into the upstanding discharge end portion 60a by means of an elongated tube 70, which is passed downwardly and disposed within the leg portion 60a and which has its upper end extending above the upper level 20 of the water and above the open top 22 of the tank for connection with a flexible tubing 72 which is connected to a source of compressed air (not shown). The same effect is realized because, as can be appreciated from a consideration of FIGURE 5, the lower open end 74 of the tubing 70 terminates at the lower open end 64 of the leg portion 60a so that the compressed air entering through the flexible tubing 72 in the tube 70 enters directly and immediately at the lower end 64 of the leg portion 60. Thus, the resultant action is the same, as that realized from the construction of FIGURE 2.

It can be appreciated that the devices, as shown and described, are thus of extreme practical value as a substitute for water conveyance devices, such as pumps, as used in aquariums, wherein the water is transferred from filter tanks adjacent to aquariums. The value thereof is evidenced in the greater amount of water which is motivated at a speedier rate, using identical amounts of air power but being able to realize the utilization of very inexpensive and weak air compressors. The present invention accomplishes the important factors that the speed and quantity of water which passes through a filter is important to the purification of the water, for the faster a given body of water flows, the more frequently it can be cycled through the filter.

In the arrangements of FIGURES 1 through 3 and 5, no provision has been made for the circulation of aquarium water, that is the large body of water which occupies the aquarium tank 10 proper. The cycle of filtration is generally confined to the vicinity of the tank in the immediate environment of the filtering facilities. Though this permits and achieves a very efficient filtering of the water, it is proposed, as shown in FIGURE 6, that the leg portion 60a of the arrangement of FIGURE 5, be provided with a substantially free horizontally disposed discharge end portion 76, which will, in effect, contribute to better circulation of the aquarium water by directing the newly filtered water to locations remote from the filter means. Such directional discharge will cause a churning of the water which will prevent stagnant motionless pockets and will allow all the aquarium water a better opportunity of cycling back to the filtering means 24 for refiltration. It should be recognized in the features of this device that the air bubbles, being discharged at a lower level, inside the aquarium tank 10 proper, rather than the filter chamber, will contribute to better aeration and observation of the aquarium water.

A further modification is shown in FIGURE 4, wherein the device of FIGURE 2 has the leg portion 40a provided with a horizontally disposed and inwardly directed discharge end portion 78, which is similar to the end portion 76 of the tubing of FIGURE 6 and which accomplishes the same objectives, insofar as allowing all of the aquarium water a better opportunity of cycling back to the filtering means for refiltration and causing, due to its horizontal positioning within the water in the aquarium tank, a churning of the water which will prevent stagnant motionless pockets and allow all of the newly filtered water to move to locations remote from the filtering means 24.

What is claimed as new is as follows:

1. A filtering arrangement for an aquarium tank adapted to contain a body of water and having a vertical wall provided with an upper end comprising a filter tank adapted to contain a filtering medium and a body of water and having a side wall supported in an adjoining relation to the upper end of the side wall of the aquarium tank, a naturally functioning generally U-shaped siphon tube having open-ended leg portions of substantially similar length immersed within the water contained by the aquarium tank and by the filter tank with said tube having a bight portion connecting said leg portions and disposed over the upper ends of the walls of the tanks, a second generally U-shaped siphon tube having a bight portion overlying the upper ends of the walls of the tanks with said second tube being disposed alongside the first tube and having a first open-ended leg portion submerged within the water in the filter tank and having a second substantially longer open-ended leg portion submerged within the water in the aquarium tank, said second leg portion having a lower end and having a discharge end portion extending substantially vertically upwardly from the lower end and terminating below the surface level of the water in the aquarium tank in an open discharge end and means for continuously introducing a relatively weak air pressure into the second leg portion with the air being injected into the discharge end portion and moving along the longitudinal axis thereof toward the open discharge end so as to create and maintain a suction in the second leg portion thereby establishing and maintaining a power siphon action in the second tube whereby a continuous circulation of water from the aquarium tank to and from the filter tank is maintained under a constantly functioning siphon action.

2. The invention of claim 1 wherein means is provided adjacent the juncture between the lower end of the second leg portion of the second tube and the vertically directed discharge end portion thereof for introducing the relatively weak air pressure into the discharge end portion and includes a nipple fitting provided on the discharge end portion adjacent the juncture and a tube from a weak air compressor connected to the fitting.

3. The invention of claim 1 wherein means is provided adjacent the juncture between the lower end of the second leg portion of the second tube and the vertically directed discharge end portion thereof for introducing the relatively weak air pressure into the discharge end portion and includes a vertical pipe fixedly extending from the juncture in communication with the lower end of the discharge end portion and disposed vertically between the second leg portion and the discharge end portion thereof and having an upper open end projected above the surface level of the water in the aquarium tank and a flexible hose from a weak air compressor attached to the upper end of the pipe.

4. The invention of claim 1 wherein said discharge end portion terminates in a substantially horizontally disposed outer end having the open discharge end.

5. The invention of claim 2 wherein said filter tank is composed of side by side compartments divided by a partition wall, said partition wall being formed with openings communicating the compartments, the leg portion of the first siphon tube being disposed in one compartment and the first leg portion of the second siphon tube being disposed in the other compartment and the one compartment having a filtering medium therein.

6. The invention of claim 5 wherein the first leg portion of the second siphon tube and the leg portion of the first tube disposed within the filter tank ara coterminus in length and the openings in the partition wall are provided in the lower end thereof below the leg portions in the filter tank.

References Cited
UNITED STATES PATENTS

| | | | |
|---|---|---|---|
| 2,303,757 | 12/1942 | Pierson | 210—169 X |
| 2,737,490 | 3/1956 | Lambertson | 210—169 |
| 2,783,893 | 3/1957 | Romanoff | 210—169 X |
| 3,146,195 | 8/1964 | Berardi | 210—169 |

REUBEN FRIEDMAN, Primary Examiner

T. A. GRANGER, Assistant Examiner

U.S. Cl. X.R.

119—5